US008937949B2

(12) United States Patent
Manula et al.

(10) Patent No.: US 8,937,949 B2
(45) Date of Patent: Jan. 20, 2015

(54) METHOD AND SYSTEM FOR INFINIBAND HOST CHANNEL ADAPTER MULTICAST PACKET REPLICATION MECHANISM

(71) Applicant: Oracle International Corporation, Redwood Shores, CA (US)

(72) Inventors: Brian Edward Manula, Oslo (NO); Knut Hallvard Tvete, Kurland (NO); Morten Schanke, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 91 days.

(21) Appl. No.: 13/721,704

(22) Filed: Dec. 20, 2012

(65) Prior Publication Data

US 2014/0177629 A1 Jun. 26, 2014

(51) Int. Cl.
*H04L 12/28* (2006.01)
*H04L 12/761* (2013.01)

(52) U.S. Cl.
CPC ...................................... *H04L 45/16* (2013.01)
USPC ............ 370/390; 370/392; 370/389; 370/412

(58) Field of Classification Search
None
See application file for complete search history.

(56) References Cited

U.S. PATENT DOCUMENTS

| | | | |
|---|---|---|---|
| 5,898,687 A * | 4/1999 | Harriman et al. ............. | 370/390 |
| 6,459,698 B1 | 10/2002 | Acharya | |
| 6,563,790 B1 | 5/2003 | Yu et al. | |
| 6,741,559 B1 | 5/2004 | Smeulders et al. | |
| 6,789,143 B2 | 9/2004 | Craddock et al. | |
| 6,904,507 B2 | 6/2005 | Gil | |
| 6,917,987 B2 | 7/2005 | Parthasarathy et al. | |
| 7,016,996 B1 | 3/2006 | Schober | |
| 7,116,673 B2 * | 10/2006 | Kashyap et al. .............. | 370/412 |
| 7,136,353 B2 | 11/2006 | Ha et al. | |
| 7,150,021 B1 | 12/2006 | Vajjhala et al. | |
| 7,330,918 B2 | 2/2008 | Yamamoto et al. | |
| 7,337,446 B2 | 2/2008 | Sankaranarayan et al. | |
| 7,401,126 B2 | 7/2008 | Pekkala et al. | |
| 7,496,698 B2 | 2/2009 | Biran et al. | |
| 7,609,636 B1 | 10/2009 | Mott | |
| 7,620,693 B1 | 11/2009 | Mott et al. | |
| 7,640,544 B2 | 12/2009 | Flood et al. | |

(Continued)

OTHER PUBLICATIONS

Pfister, G., "An Introduction to the Infiniband Architecture", IBM Enterprise Server Group, Chapter 42, Aug. 7, 2002, 16 pages.

(Continued)

*Primary Examiner* — Duc C Ho
(74) *Attorney, Agent, or Firm* — Osha Liang LLP (57) ABSTRACT

A method for multicast replication by a host channel adapter (HCA) involving receiving a multicast packet, by a receive pipeline for processing packets of the HCA, storing, in a payload RAM within the HCA, a multicast packet payload corresponding to a data portion of the multicast packet, identifying, from a multicast header of the multicast packet, a plurality of destination underlying functions and a plurality of corresponding destination QPs to which the multicast packet is directed, wherein each destination underlying function of corresponds to a virtual machine located on a host, identifying, from the multicast header, information to be replicated for each multicast packet destination, injecting, by the HCA, a number of multicast packet descriptors corresponding to a number of the corresponding destination QPs into the receive pipeline of the HCA, and copying, from the payload RAM, the multicast packet payload to each of the corresponding destination QPs.

20 Claims, 4 Drawing Sheets

(56) References Cited

U.S. PATENT DOCUMENTS

| | | |
|---|---|---|
| 7,742,497 B2 | 6/2010 | Ganti et al. |
| 7,769,015 B2 | 8/2010 | Huang et al. |
| 7,782,805 B1 | 8/2010 | Belhadj et al. |
| 7,787,366 B2 | 8/2010 | Cuffaro et al. |
| 7,817,634 B2 | 10/2010 | Coffman et al. |
| 7,830,919 B1 | 11/2010 | Thompson |
| 7,882,505 B2 | 2/2011 | Garthwaite et al. |
| 7,899,050 B2 | 3/2011 | Craddock et al. |
| 7,996,583 B2 * | 8/2011 | Wilkinson ............ 710/33 |
| 8,037,529 B1 | 10/2011 | Chiueh et al. |
| 8,244,946 B2 | 8/2012 | Gupta et al. |
| 8,255,475 B2 | 8/2012 | Kagan et al. |
| 8,259,576 B2 | 9/2012 | Lee et al. |
| 8,259,746 B2 | 9/2012 | Lo et al. |
| 8,274,976 B2 | 9/2012 | Aloni et al. |
| 8,296,386 B1 | 10/2012 | Micalizzi, Jr. |
| 2001/0036185 A1 | 11/2001 | Dempo |
| 2002/0172195 A1 | 11/2002 | Pekkala et al. |
| 2003/0101158 A1 | 5/2003 | Pinto et al. |
| 2004/0064664 A1 | 4/2004 | Gil |
| 2004/0120332 A1 | 6/2004 | Hendel |
| 2005/0018669 A1 | 1/2005 | Arndt et al. |
| 2005/0060443 A1 | 3/2005 | Rosner |
| 2005/0132374 A1 | 6/2005 | Flood et al. |
| 2005/0135419 A1 | 6/2005 | Pullen et al. |
| 2005/0223118 A1 | 10/2005 | Tucker et al. |
| 2006/0136988 A1 | 6/2006 | Raja et al. |
| 2007/0008886 A1 | 1/2007 | Chen et al. |
| 2007/0019665 A1 | 1/2007 | Benveniste |
| 2007/0165672 A1 | 7/2007 | Keels et al. |
| 2007/0223472 A1 | 9/2007 | Tachibana et al. |
| 2007/0223483 A1 | 9/2007 | Huang et al. |
| 2007/0242686 A1 | 10/2007 | Zegers et al. |
| 2008/0140984 A1 | 6/2008 | Shearer |
| 2008/0168194 A1 | 7/2008 | Gregg et al. |
| 2009/0125604 A1 | 5/2009 | Chang et al. |
| 2011/0216648 A1 | 9/2011 | Mehrotra et al. |
| 2012/0239832 A1 | 9/2012 | Subramanian et al. |

OTHER PUBLICATIONS

Shanley, T., "Infiniband Network Architecture", MindShare, Inc., Chapter 1, Jan. 1, 2003, 18 pages.

Shanley, T., "Infiniband Network Architecture", MindShare, Inc., Chapter 3-6, Jan. 1, 2003, 102 pages.

Shanley, T., "Infiniband Network Architecture", MindShare, Inc., Chapter 13, Jan. 1, 2003, 33 pages.

* cited by examiner

METHOD AND SYSTEM FOR INFINIBAND HOST CHANNEL ADAPTER MULTICAST PACKET REPLICATION MECHANISM

CROSS-REFERENCE TO RELATED APPLICATIONS

The present application contains subject matter that may be related to the subject matter in the following U.S. patent application, which is assigned to a common assignee and is incorporated by reference in its entirety: "Method and System for Infiniband® Host Channel Adapter Quality of Service" (application Ser. No. 13/149,449) filed on May 31, 2011.

BACKGROUND

The Infiniband® network includes nodes that communicate through a channel-based switched fabric (Infiniband® is a registered trademark of Infiniband Trade Association, located in Beaverton, Oreg.). For example, the nodes may be a host, an input/output subsystem, or a router which connects to another network. The switched fabric is made of a collection of switches, routers, and/or links that connect a set of channel adapters. The channel adapters form an interface between the switched fabric and the nodes. The channel adapter of the host is referred to as a host channel adapter. The channel adapter of an I/O subsystem is referred to as a target channel adapter.

In Infiniband®, two processes communicate using a queue pair. A queue pair (QP) includes a send queue and a receive queue. Specifically, in order for a process to send a message to another process, the process posts the message to the send queue. The host channel adapter sends the message in the form of packets to the channel adapter having the receive queue. Each packet that is sent may include a packet sequence number. Logic associated with the receive queue ensures that packets are processed in a particular order using the packet sequence number.

Infiniband® supports operations such as multicast packet replication. Specifically, multicast packet replication requires that a copy of a packet be delivered to multiple QPs on the host system. Common solutions to this use software replication. Specifically, all incoming multicast packets are redirected to a single QP on a single virtual machine (VM). Host software on that VM is responsible for implementing replication to all VMs. Each VM is then responsible for replicating a packet to each group member QP.

SUMMARY

In general, in one aspect, the invention relates to a method for multicast replication by a host channel adapter (HCA), involving receiving, by the HCA, a multicast packet, wherein the HCA comprises responder processing logic for processing packets through a receive pipeline in the HCA, storing, in a payload random access memory (RAM) within the HCA, a multicast packet payload corresponding to a data portion of the multicast packet, identifying, from a multicast header of the multicast packet, a plurality of destination underlying functions and a plurality of corresponding destination QPs within a multicast group to which the multicast packet is directed, wherein each destination underlying function of the plurality of destination underlying functions corresponds to a virtual machine located on a host operatively connected to the HCA, identifying, from the multicast header, information to be replicated for each multicast packet destination, injecting, by the HCA, a number of multicast packet descriptors corresponding to a number of the corresponding destination QPs into the receive pipeline of the HCA, wherein each multicast packet descriptor comprises the information to be replicated, wherein the multicast packet descriptors are processed in the receive pipeline of the HCA, and copying, from the payload RAM, the multicast packet payload to each of the corresponding destination QPs in host memory.

In general, in one aspect, the invention relates to a host channel adapter (HCA) comprising a plurality of underlying functions, wherein each of the plurality of underlying functions corresponds to a virtual machine in a host operatively connected to the HCA, a receive packet processing pipeline, the receive packet processing pipeline being configured to receive a multicast packet comprising a multicast header and a payload corresponding to a data portion of the multicast packet, store, in a payload random access memory (RAM) within the HCA, the multicast packet payload, a multicast inspection engine configured to identify, from the multicast header of the multicast packet, a subset of the plurality of destination underlying functions and a plurality of corresponding destination QPs within a multicast group to which the multicast packet is directed, and identify, from the multicast header, information to be replicated for each multicast packet destination, wherein the receive packet processing pipeline is further configured to inject a number of multicast packet descriptors corresponding to a number of the plurality of corresponding destination QPs identified by the multicast inspection engine into the receive packet processing pipeline, wherein each multicast packet descriptor comprises the information to be replicated, and copy, from the payload RAM, the multicast packet payload to each of the corresponding destination QPs in host memory.

In general, in one aspect, the invention relates to a system including a host and a host channel adapter (HCA) operatively connected to the host. The host includes a first virtual machine comprising a first destination queue pair (QP), and a second virtual machine comprising a second destination QP. The HCA comprises a first underlying function corresponding to the first virtual machine, a second underlying function corresponding to the second virtual machine, a receive packet processing pipeline, the receive packet processing pipeline configured to receive a multicast packet comprising a multicast header and a payload corresponding to a data portion of the multicast packet, store, in a payload random access memory (RAM) within the HCA, the multicast packet payload, a multicast inspection engine configured to identify, from the multicast header of the multicast packet, the first and second underlying functions and corresponding first and second destination QPs within a multicast group to which the multicast packet is directed, and identify, from the multicast header, information to be replicated for each multicast packet destination, wherein the receive packet processing pipeline is further configured to inject a multicast packet descriptor for each of the corresponding first and second destination QPs identified by the multicast inspection engine into the receive packet processing pipeline, wherein each multicast packet descriptor comprises the information to be replicated, and copy, from the payload RAM, the multicast packet payload to each of the first and second corresponding destination QPs in host memory.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide hardware facilities on a host channel adapter for replicating multicast packets. Hardware within the Infiniband® host channel adapter stores a state for tracking copies of the packet and mechanisms for limiting the number of multicast packets stored at any time.

Figure 1:
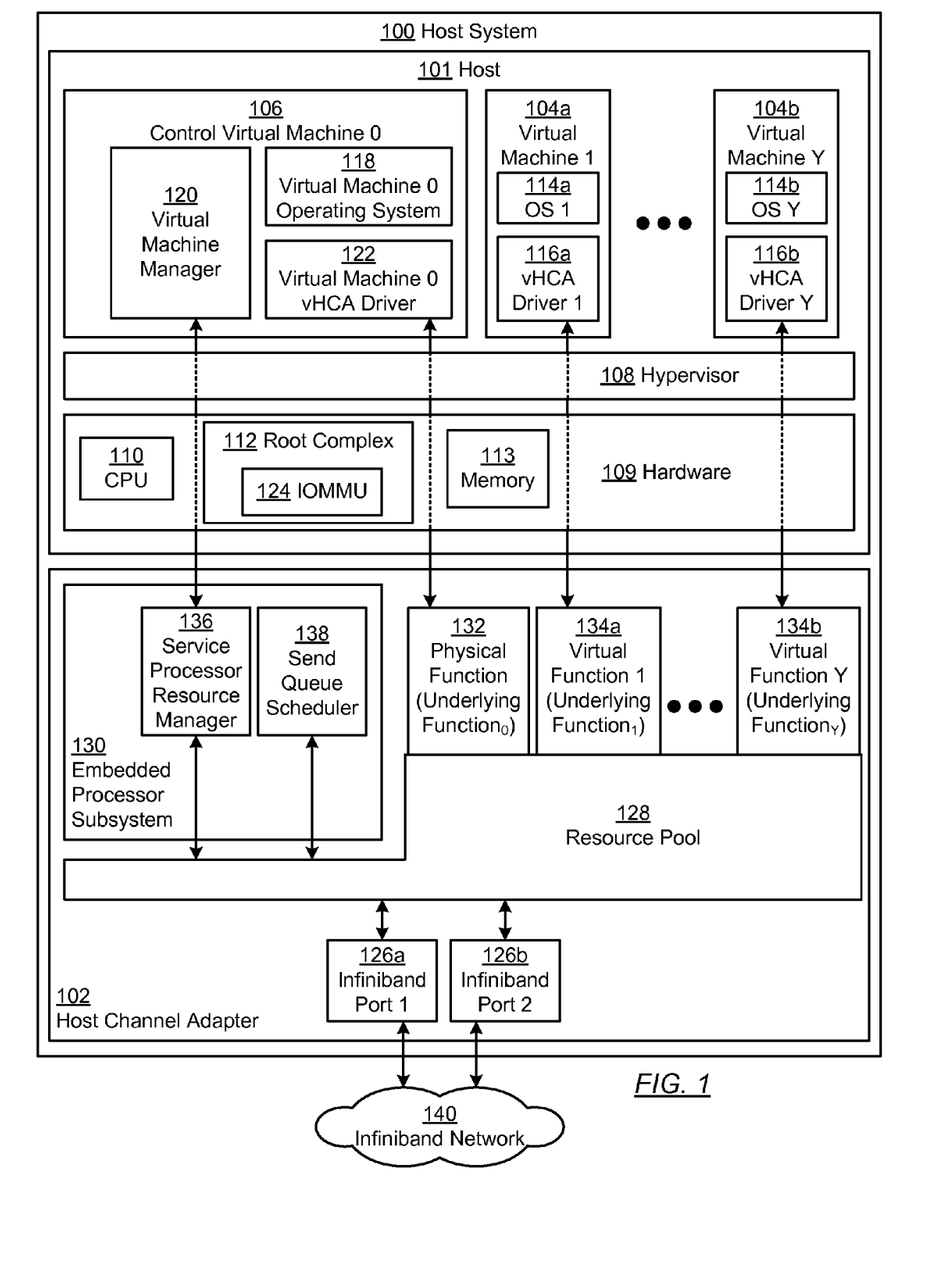
FIGS. 1-2 show schematic diagrams in one or more embodiments of the invention.

FIG. 1 shows a schematic diagram of a host system (100) in one or more embodiments of the invention. In one or more embodiments of the invention, the host system (100) is any physical computing device. Specifically, the host system (100) includes at least a minimum amount of hardware necessary to process instructions. As shown in FIG. 1, the host system (100) includes a host (101) and a host channel adapter (102) in one or more embodiments of the invention. These components are discussed below.

In one or more embodiments of the invention, the host (101) includes one or more guest virtual machines (e.g., virtual machine 1 (104a), virtual machine Y (104b)), a control virtual machine (106), a hypervisor (108), and a root complex (112). Each of these components is discussed below.

Broadly speaking, the virtual machines (e.g., virtual machine 1 (104a), virtual machine Y (104b), control virtual machine (106)) are distinct operating environments configured to inherit underlying functionality of the host operating system via an abstraction layer. In one or more embodiments of the invention, each virtual machine includes a separate instance of an operating system (e.g., OS 1 (114a), OS Y (114b)) (OS in FIG. 1). The separate instances of the operating system may be the same type of operating system or different types of operating systems.

Specifically, the guest virtual machine operating system (e.g., OS 1 (114a), OS Y (114b)) operates as if the guest virtual machine operating system is the only operating system on the host (101) and the resources (e.g., processor cycles, memory, resources of the host channel adapter) allocated to the guest virtual machine are the only resources available on the host (101). Thus, the guest virtual machine operating system (e.g., OS 1 (114a), OS Y (114b)) includes functionality to control the operating environment of applications executing in the guest virtual machine using resource allocated to the guest virtual machine Each virtual machine may be allocated disjoint or non-overlapping physical memory (113).

Many different types of virtual machines exist. For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). Another example is a Solaris™ Container. In such cases, the Solaris™ Container may execute in the host operating system, which may be a Solaris™ operating system. Solaris™ is a trademark of Oracle America, Inc. In one embodiment of the invention, the host operating system may include both virtual machines and virtual execution environments.

In one or more embodiments of the invention, the guest virtual machine includes a virtual host channel adapter device driver (e.g., vHCA driver 1 (116a), vHCA driver Y (116b)). The virtual host channel adapter device driver is software program that provides an interface to host channel adapter (102) for the guest virtual machine operating system. Specifically, when the guest virtual machine operating system wants to send commands to the host channel adapter (102), the virtual machine operating system invokes a routine in the virtual host channel adapter device driver. In response, the virtual host channel adapter device driver issues commands to a virtualized device controller (not shown) presented by the hypervisor (108) (discussed below). In turn, the hypervisor (108) includes functionality to transmit the message to the host channel adapter (102).

In addition to the guest virtual machine (e.g., virtual machine 1 (104a), virtual machine Y (104b)), the host (101) may also include a control virtual machine (106). In one or more embodiments of the invention, the control virtual machine (106) has a separate address space and operating system environment than the guest virtual machine (e.g., virtual machine 1 (104a), virtual machine Y (104b)). The control virtual machine (106) includes a control virtual machine operating system (118), a control virtual machine manager (120), and a virtual machine host channel adapter device driver (122). The virtual machine host channel adapter device driver (122) includes functionality similar to the guest virtual machine host channel adapter device drivers (e.g., vHCA driver 1 (116a), vHCA driver Y (116b)) discussed above. The host virtual machine operating system (118) includes functionality to provide an operating environment for software executing in the control virtual machine (106).

In one or more embodiments of the invention, the software executing in the control virtual machine (106) includes a virtual machine manager (120) (discussed below). In one or more embodiments of the invention, the virtual machine manager (120) includes functionality to configure the hypervisor (108), configure the host channel adapter (102), create, remove, and configure guest virtual machines, and perform the management of the host (101). With regards to configuring the host channel adapter, the virtual machine manager includes functionality to send commands to the host channel adapter to adjust the number of resources allocated to each virtual machine To receive parameter values for performing the above management tasks, the virtual machine manager (120) may include a user interface and/or an application programming interface for communicating with a computer administrator or another program in one or more embodiments of the invention.

Continuing with FIG. 1, the hypervisor (108) includes functionality to control the sharing of hardware resources on the host (101). Specifically, the hypervisor (108) includes functionality to virtualize the physical devices of the host (101) so that more than one operating system may share the same physical device transparently in accordance with one or more embodiments of the invention. Further, the hypervisor (108) controls when the guest virtual machine (e.g., virtual machine 1 (104a), virtual machine Y (104b)) and the control virtual machine (106) are allowed to execute. For example, the hypervisor (108) may be a thin-privileged layer of software that only manages which guest virtual machine or the host virtual machine (106) is executing.

Continuing with the host, the host (101) includes hardware (109). The hardware (109) may include, for example, a central processing unit (110), memory (113), and a root complex (112). In one or more embodiments of the invention, the CPU (110) is a hardware processor component for processing instructions of the host. The CPU (110) may include multiple hardware processors. Alternatively or additionally, each hardware processor may include multiple processing cores in one or more embodiments of the invention. In general, the CPU (110) is any device configured to execute instructions on the host (101).

In one or more embodiments of the invention, the memory (113) is any type of hardware device for storage of data. In one or more embodiments of the invention, the memory (113) may be partitioned on a per-virtual machine basis, such that each virtual machine (e.g., control virtual machine (106), virtual machine 1 (104a), virtual machine Y (104b)) is allocated separate and distinct memory. In one or more embodiments of the invention, the memory (113) includes functionality to store a send queue (not shown).

A separate send queue may be stored in memory for each virtual machine. Alternatively or additionally, multiple virtual machines may share one or more send queues. In one or more embodiments of the invention, a send queue includes functionality to store an ordered list of command identifiers for commands for processing by the host channel adapter (102). In one or more embodiments of the invention, the command identifiers may be the actual commands and/or references to the commands.

In one or more embodiments of the invention, the root complex (112) includes functionality to connect the CPU and memory subsystem to a peripheral component interconnect (PCI) Express switch fabric. Specifically, in one or more embodiments of the invention, the root complex (112) connects the host (101) to the host channel adapter (102). Although FIG. 1 shows the root complex (112) as separate from the CPU (110), the root complex (112) may be integrated as part of the CPU.

The root complex (112) includes an input/output memory management unit (IOMMU) (124) in one or more embodiments of the invention. The IOMMU (124) includes functionality to connect a direct memory access (DMA) input/output (I/O) bus to the memory. In one or more embodiments of the invention, the IOMMU (124) includes functionality to translate addresses from one level of abstraction to another.

Continuing with FIG. 1, the host (101) is connected to the host channel adapter (102). In one or more embodiments of the invention, the connection between the host (101) and the host channel adapter (102) may be a PCI express connection. Specifically, the host channel adapter may connect to a PCI express fabric connector on the host.

In one or more embodiments of the invention, the host channel adapter (102) is a hardware device configured to connect the host (101) to the Infiniband® network (140). Specifically, the host channel adapter (102) includes functionality to receive commands from the host (101) and process the commands. Processing the commands may include performing DMA with host memory to obtain and store packet data and to obtain control information, performing any validation required on the packet data, generating packets from the packet data, and sending and receiving packets on the Infiniband® network (140). FIG. 1 shows a schematic diagram of the host channel adapter (102) from the prospective of the host (101). As shown in FIG. 1, the host channel adapter (102) includes at least one Infiniband® port (e.g., Infiniband® port 1 (126a), Infiniband® port 2 (126b)), a resource pool (128), and an embedded processor subsystem (130). Each of the components of the host channel adapter is discussed below.

In one or more embodiments of the invention, an Infiniband® port (e.g., Infiniband® port 1 (126a), Infiniband® port 2 (126b)) is a physical interface connector between the host channel adapter (102) and the Infiniband® network (140). Although FIG. 1 shows two Infiniband® ports, more or fewer ports may exist without departing from the invention.

The resource pool (128) is a collection of resources that are required to send and receive packets on the Infiniband® network. Specifically, the resource pool (128) corresponds to the collection of hardware and stored data that is shared by the virtual machines (e.g., control virtual machine (106), virtual machine 1 (104a), virtual machine Y (104b)). In general, the resource pool is configured to receive and execute commands from the virtual machines (104a, 104b). A command corresponds to an instruction to the host channel adapter. For example, a command may be an instruction to send a message on the Infiniband® network (not shown). A command includes command data in one or more embodiments of the invention. Specifically, command data is data in the command. When the command is an instruction to send a message on the Infiniband® network, the command may include the message itself or one or more addresses in the host memory having the message. The host channel adapter is configured to obtain the command, obtain the message from the command or from host memory referenced in the command, partition the message into packets if required, and send the packets on the Infiniband® network in accordance with an Infiniband® protocol. In one or more embodiments of the invention, the message is packet data. Specifically, packet data is data sent in the packets on the Infiniband® network. Thus, the packet data may be in the command or in the one or more addresses in host memory. Further aspects of the resource pool (128) as relevant to the receipt of multicast packets are discussed in FIG. 2 below.

In one or more embodiments of the invention, the sharing of the resource pool is performed using the concepts of physical function and virtual functions. A physical function (132) exposes the actual hardware of the host channel adapter (102) to an operating system. Specifically, by way of the physical function, the control virtual machine operating system (118) may control the host channel adapter. Thus, the physical function allows the control virtual machine (106) to control the host channel adapter (102), such as to disable the host channel adapter (102).

A virtual function (e.g., virtual function 1 (134a), virtual function Y (134b)) exposes a virtualized host channel adapter to a virtual machine Specifically, the virtual function (e.g., virtual function 1 (134a), virtual function Y (134b)) exposes to the virtual machine operating system only the partition of the resource pool allocated to the virtual machine To the guest virtual machine (e.g., virtual machine 1 (104a), virtual machine Y (104b)), the resources exposed by the virtual function (e.g., virtual function 1 (134a), virtual function Y (134b)) appear as if the resource are the only resources on the host channel adapter (102). Thus, the virtual function (e.g., virtual function 1 (134a), virtual function Y (134b)) allows the virtual machine operating system (e.g., OS 1 (114a), OS Y (114*b*)) to control the portion of resources allocated to the virtual machine. In other words, a virtual function (e.g., virtual function 1 (134*a*), virtual function Y (134*b*)) provides the virtual machine operating system (e.g., OS 1 (114*a*), OS Y (114*b*)) the appearance that the virtual machine operating system (e.g., OS 1 (114*a*), OS Y (114*b*)) is controlling the host channel adapter (102) as a whole even though the actions of the virtual machine operating system (e.g., OS 1 (114*a*), OS Y (114*b*)) do not affect any other virtual function (e.g., virtual function 1 (134*a*), virtual function Y (134*b*)).

In one or more embodiments of the invention, the term, underlying function (UF), is used to generically refer to either a physical function or a virtual function. Specifically, as used herein, an underlying function may be a physical function or a virtual function.

The embedded processor subsystem (EPS) (130) corresponds to an embedded processor and logic for managing the host channel adapter (102). The logic may be firmware or hardware logic. The embedded processor subsystem (130) includes a service processor resource manager (136). The service processor resource manager (136) includes functionality to receive and process the management commands on the host channels adapter. For example, the management commands may be to change the allocation of host channel adapter resources, change the configuration of the host channel adapter, and perform other management of the host channel adapter. With regards to resource allocation, the service processor resource manager includes functionality to change the allocation of the host channel adapter resources to underlying functions and change the allocation of the host channel adapter resources to quality of service (QoS) levels within the underlying functions.

As described above, the host system (100) of FIG. 1 is configured to receive multicast packets from the Infiniband® Network (140). Each multicast packet received via the Infiniband® Network (140) may transit via multiple destination functions to eventual virtual machine queue pair (QP) destinations. Accordingly, in one or more embodiments of the invention, the host channel adapter (102) is configured to determine which destination underlying functions and destination QPs are to receive the multicast packet. More specifically, the EPS (130) firmware logic may include functionality to inspect multicast packet headers, extract relevant information from the headers, and determine the destination functions and corresponding QPs for each destination function for the multicast packet. This functionality of the host channel adapter (102) is described in detail in FIG. 2.

Continuing with FIG. 1, the EPS (130) may include a send queue scheduler (138). The send queue scheduler (138) includes functionality to schedule commands identified in the send queue on the host channel adapter. Specifically, the send queue scheduler includes functionality to iterate through the send queue and store commands identified in the send queue on the host channel adapter (102).

Figure 2:
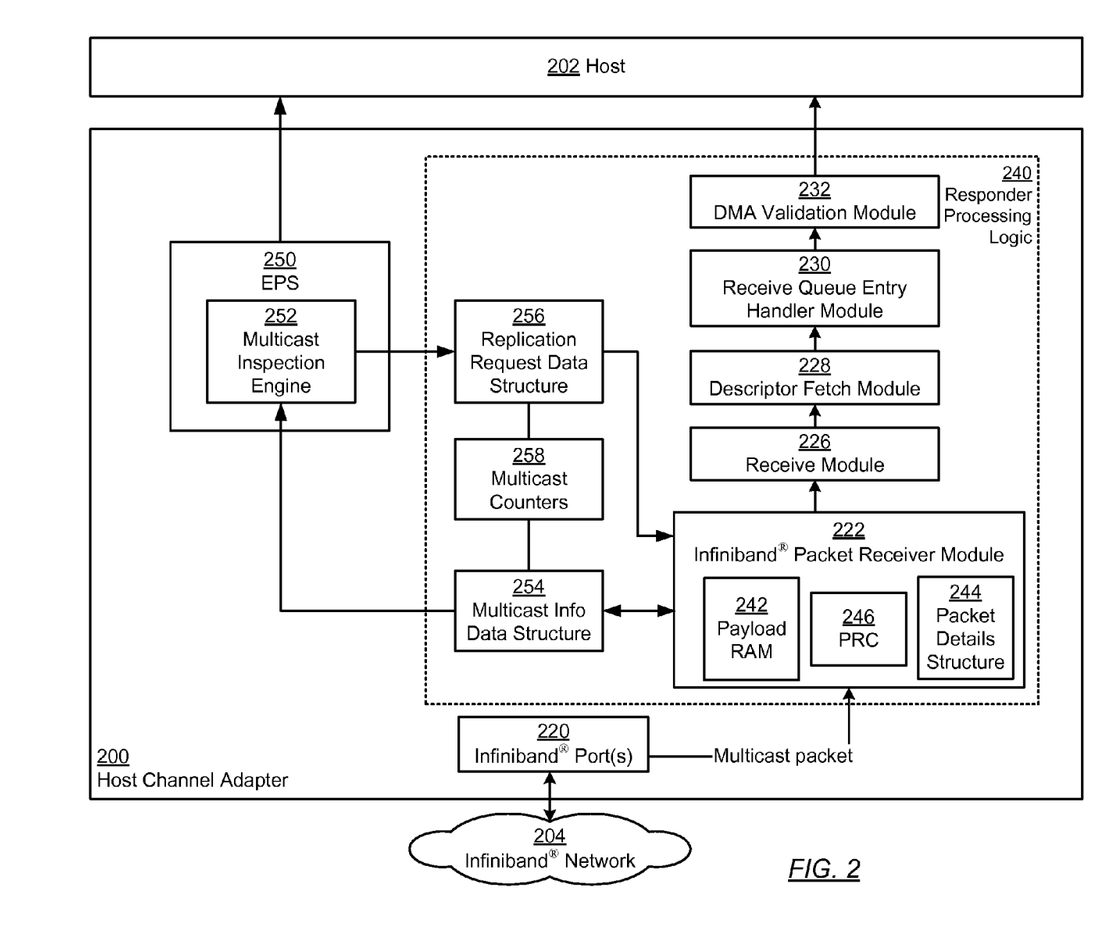

As discussed above, FIG. 1 provides a general diagram of the host channel adapter (102) in one or more embodiments of the invention. FIG. 2 shows a schematic diagram of the receiving pipeline within the host channel adapter (200). Specifically, FIG. 2 shows components of the resource pool for receipt of messages on the Infiniband® network as shared between virtual machines and components to allocate resources of the resource pool in one or more embodiments of the invention. More specifically, resource pool includes a transmit pipeline (not shown) for transmitting packets through the Infiniband® network (204) with transmitting processing logic (not shown), and a receive packet processing pipeline (also referred to as a receive pipeline of the HCA) for receiving packets from the Infiniband® network (204). The receive pipeline includes with responder processing logic (240) for processing each received packet. The packets received by the responder processing logic (240) may be a combination of multicast packets and unicast packets.

As shown in FIG. 2, in one or more embodiments of the invention, the receive pipeline is partitioned into modules (222-232). Each module corresponds to hardware and/or firmware that includes functionality to perform a portion of the receive pipeline. Each module is configured to process data units. Each data unit corresponds to a command or a received message or packet. For example, a data unit may be the command, an address of a location on the communication adapter storing the command, a portion of a message corresponding to the command, a packet, an identifier of a packet, or any other identifier corresponding to a command, a portion of a command, a message, or a portion of a message.

Referring to FIG. 2, the dark arrows between modules show the transmission path of data units between modules as part of processing commands and received messages in one or more embodiments of the invention. Data units may have other transmission paths (not shown) without departing from the invention. Further, other communication channels and/or additional components of the host channel adapter (200) may exist without departing from the invention. Each of the modules for the responder processing logic (240) is described in detail below.

The responder processing logic may include the Infiniband® packet receiver module (IPRM) (222), receive module (226), descriptor fetch module (228), receive queue entry handler module (230), and DMA validation module (232). As shown, the multicast information data structure (254) and replication request data structures (256) may be extensions of the responder processing logic or of the IPRM (222) which handle functionalities specific to hardware multicast packet replication.

In one or more embodiments of the invention, the Infiniband® packet receiver module (IPRM) (222) includes functionality to receive multicast and unicast packets from the Infiniband® port(s) (220). In one or more embodiments of the invention, the IPRM (222) includes functionality to perform a checksum to verify that the packet is correct, parse the headers of the received packets, and place the payload of the packet in memory. Accordingly, the IPRM (222) is configured to split the packet header from the packet payload (data), and store the packet payload in payload memory. In one or more embodiments of the invention, the payload memory may be random access memory (RAM) and/or flash memory. Accordingly, while embodiments of the invention describe and show a payload RAM (242), such a configuration is not meant to limit the invention to a RAM for storing packet payloads. Information contained in the packet header is stored in the packet header details data structure (244).

The information stored in the packet header details data structure (244) is identical to what is passed up the pipeline for all packet types, e.g., unicast packets. In one or more embodiments of the invention, the purpose of the packet header details data structure (244) is to pull the multicast packets out of the general packet data stream so that non-multicast packets may continue to be processed while waiting for multicast replication to take place, without having to stall the whole input stream while copies are made. The packet header details data structure (244) may be a first-in-first-out (FIFO), a linked list, a table, or any other suitable data structure. In one or more embodiments of the invention, the payload reference counter (PRC) (246) keeps track of when a payload is written to the payload RAM and ensures the payload remains in the payload RAM until all copies of a multicast packet have been processed through the packet processing pipeline. More specifically, the PRC tracks a number of copies of the multicast packet descriptors injected into the packet processing pipeline and does not decrement to zero (0) until the final copy of the multicast packet descriptor has been processed.

In one or more embodiments of the invention, multicast packet headers are also split from the multicast packet payload in the same manner. However, multicast packet headers are pulled out of the packet processing pipeline and parsed by the IPRM for information that is stored in the multicast information data structure (254). In contrast, headers for unicast packets and other packet types are sent directly into the normal packet processing pipeline through modules 222-232. That is, the multicast packet headers are processed via a different route than single destination packet headers. The multicast information data structure (254) may be a first-in-first-out (FIFO) or any other type of suitable data structure (linked list, table, etc.) configured to store information which the EPS firmware needs to find all of the recipients of the multicast packet.

In one or more embodiments of the invention, information stored in the multicast information data structure (254) may include a Multicast Destination Local Identifier (MC LID) and a Multicast Global Identifier (MC GID). The MC LID is conceptually used by the vSwitch to replicate a copy of the packet to all eligible virtual HCAs. In one or more embodiments of the invention, the MC LID identifies each underlying function corresponding to the vHCAs in the host (202). In one or more embodiments of the invention, the MC LID may be a 16-bit Infiniband® address that is unique within an Infiniband® subnet. The MC GID is conceptually used by each vHCA to determine the QPs which belong to the corresponding multicast group. The MC GID may be a 128-bit multicast address used to identify an endpoint for the multicast packet. A MC GID is a valid IPv6 address that is a global unique address across Infiniband® subnets in one or more embodiments of the invention. Accordingly, the MC LID and the MC GID provide information regarding the two virtualized levels of destinations (i.e., vHCAs and corresponding QPs belonging to corresponding virtual machines) for each multicast packet header.

The EPS is configured to obtain the first entry stored in the multicast information data structure (254) and determine all of the destinations for the packet. In one or more embodiments of the invention, the EPS (250) includes a separate multicast inspection engine (252) which includes functionality to inspect the MC LID and MC GID stored in the multicast information data structure (254) and determine all destinations functions and all destination QPs within each underlying function for each multicast packet header. While FIG. 2 shows the multicast inspection engine (252) being part of the EPS firmware, in one or more embodiments of the invention, the multicast inspection engine (252) may be a stand-alone component that is not within the EPS or any other system component. For example, the multicast inspection engine (252) functionality may be implemented in hardware on-chip. Alternatively, the multicast inspection engine (252) may be implemented in software on the host (202).

Based on the number of destinations of the multicast packet header determined by the multicast inspection engine (252), the multicast inspection engine (252) writes a command to the replication request data structure (256). In one or more embodiments of the invention, the command written to the replication request data structure (256) includes the destination vHCA number and the destination QP number in that vHCA for each destination of the multicast packet. The replication request data structure (256) may be a FIFO or any other suitable data structure.

In one or more embodiments of the invention, the replication request data structure (256) also stores information which is replicated per packet for each destination of the multicast packet. Such information may include some details about the packet header itself and some control information used by the receive pipeline. For example, the information, which is replicated for each multicast packet destination QP, may include (1) a pointer to the payload in the payload RAM and the size of the payload stored; (2) the partition and queue key from the IB header (used for validating that the request is legal); (3) immediate data from the IB header (up to 4B of data which is written in the completion queue) which might be included in the header; (4) the sender global identifier (SGID) and the sender local identifier (SLID) and some assorted fields from the header (used to identify the sender of the packet and how to respond to the sender, if necessary); (5) a packet opcode; and (6) some offloading information (i.e., packet classification checksums and hashes) generated for Internet Protocol (IP) over IB (IPoIB) related to performance and security of the Infiniband® network (204).

In one or more embodiments of the invention, the replication request data structure (256) is also configured to inject a copy of the multicast packet descriptor including the header and control information for each destination QP of the multicast packet into the receive pipeline for further processing. For each copy of the multicast packet descriptor that is injected, the payload reference counter (246) in the IPRM (222) for that packet copy's payload is incremented by one (1). In this manner, the payload reference counter (246) keeps track of how many copies of the payload must be written to the eventual destinations before the payload can be removed from the payload RAM (242). The payload reference counter (246) is decremented each time a packet descriptor makes it through the pipeline. Specifically, in one or more embodiments of the invention, the payload RAM (242) decrements the PRC (246) automatically when the payload RAM (242) observes the last byte of payload data for a particular packet being read by the DMA validation module (232).

Each of the multicast information data structure (254) and the replication request data structure (256) is associated with one or more multicast counters (258), which prevent any one of the data structures (254, 256) from overrunning and generally provide flow control. In one or more embodiments of the invention, these multicast counters (258) may be controlled by the IPRM (222). For example, the multicast information data structure (254) may be associated with a counter which controls the number of multicast packet headers being processed at a given time. In one or more embodiments of the invention, a predetermined threshold for the number of multicast packet headers being processed may be determined by parameters of the HCA. Upon reaching this threshold, further multicast packet headers may be dropped from the processing pipeline. In alternate embodiments of the invention, the threshold may be set to maximum, in which case no packets would be dropped. This mechanism is used to ensure that the entire system does not get backed-up handling multicast packets and allows unicast packets a chance to enter the normal packet processing pipeline. Similarly, the replication request data structure (256) may be associated with a counter which ensures that the replication request data structure (256) does not overrun and provides flow control back to the EPS.

The multicast information data structure (254) and replication request data structure (256) may be part of the receiving pipeline in the host channel adapter (200). Alternatively, modules 254 and 256 may be the points of communication between the EPS (250) and the receiving packet processing pipeline.

After the replication request data structure injects as many copies of the multicast descriptor as needed for the number of QP destinations of the multicast packet into the receive pipeline, each individual multicast descriptor is handled by the responder processing logic as if the packet is a normal unicast packet. Accordingly, continuing with FIG. 2, in one or more embodiments of the invention, the IPRM includes functionality to transmit a data unit for each packet to the receive module (226) for further processing.

Additionally or alternatively, the receive module (226) includes a queue that includes functionality to store data units waiting for one or more reference to buffer location(s) or waiting for transmission to a next module. Specifically, when a process in a virtual machine is waiting for data associated with a queue pair, the process may create receive queue entries that reference one or more buffer locations in host memory in one or more embodiments of the invention. For each data unit in the receive module hardware linked list queue, the receive module includes functionality to identify the receive queue entries from a host channel adapter cache or from host memory, and associate the identifiers of the receive queue entries with the data unit.

In one or more embodiments of the invention, the descriptor fetch module (228) includes functionality to obtain descriptors for processing a data unit. For example, the descriptor fetch module may include functionality to obtain descriptors for a receive queue, a shared receive queue, a ring buffer, and the completion queue.

In one or more embodiments of the invention, the receive queue entry handler module (230) includes functionality to obtain the contents of the receive queue entries. In one or more embodiments of the invention, the receive queue entry handler module (230) includes functionality to identify the location of the receive queue entry corresponding to the data unit and obtain the buffer references in the receive queue entry. In one or more embodiments of the invention, the receive queue entry may be located on a cache of the host channel adapter (200) or in host memory.

In one or more embodiments of the invention, the DMA validation module (232) includes functionality to perform DMA validation and initiate DMA between the host channel adapter and the host memory. Further, in one or more embodiments of the invention, the DMA validation module (232) includes functionality to read data from the payload RAM (242) and write the data to host memory.

In one or more embodiments of the invention, multicast packet replication applies to 'Send/Receive' transactions on the HCA. In this type of transaction, the remote responder node sends data and provides no information about where the data should be placed in host memory. Instead, the local Receive Queue of the QP maintains a list of buffers in host memory to which the data may be delivered. This list takes the form of a series of 'Scatter/Gather Lists' (SGLs). A single SGL consists of 1-N Scatter Gather Entries (SGEs). A single SGE may include three basic parts: an address, a length and a local key (L_Key). The L_Key is used to verify that the local QP is allowed to write to the referenced memory.

The host (202) includes the destination virtual machines and QPs for each copy of the multicast packet. Accordingly, after the replication request data structure injects the multicast descriptors into the receive pipeline, the multicast descriptor makes its way through the responder processing logic (240) modules, all relevant queue descriptors are fetched and the payload is delivered directly to the QP(s) in the host (202).

Although FIGS. 1-2 show a certain configuration of components, other configurations may be used without departing from the invention. For example, rather than having the data structures and counters associated with multicast packet replication be an extension of the receive pipeline for the Infiniband® network, these data structures and counters values operate as part of the EPS. Alternatively, in one or more embodiments of the invention, the functionality of the multicast inspection engine may be implemented in hardware on-chip, in software on the host (202), or in the firmware logic of the EPS (250). Other variations of the system may be used without departing from the invention.

Figure 3:
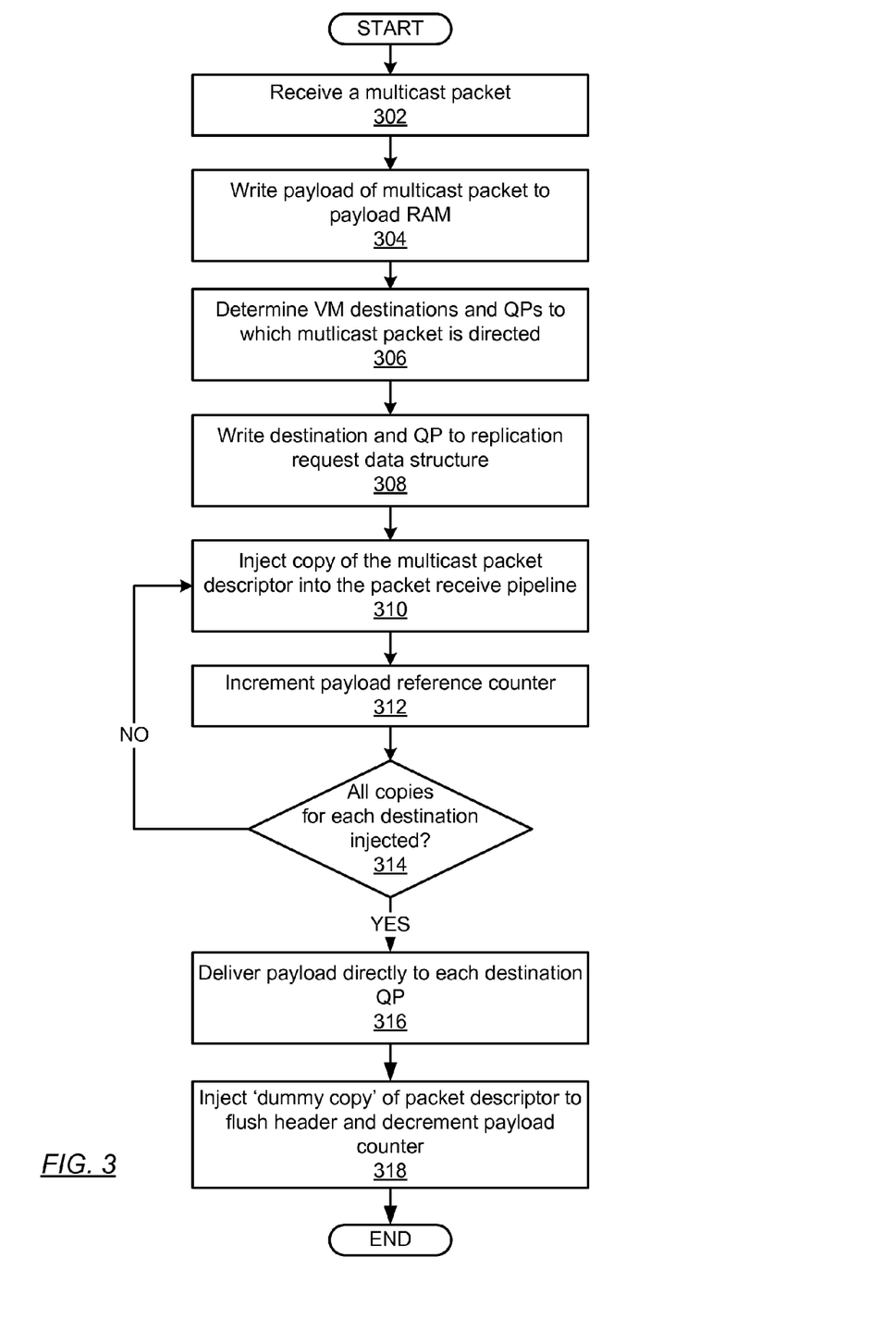
FIG. 3 shows a flowchart for a method of implementing hardware multicast replication in one or more embodiments of the invention.

FIG. 3 shows a flowchart in one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Initially, a multicast packet is received (ST 302). In one or more embodiments of the invention, the multicast packet is received from the Infiniband® network by the responder processing logic in the HCA. More specifically, the IPRM of the receive pipeline receives the multicast packet. In one or more embodiments of the invention, a multicast packet is received just as any other unicast packet, and thus, at this stage of the process, the multicast packet is received in the same manner as any other type of packet. Each multicast packet includes a multicast header and a payload (data). Next, the payload of the multicast packet is written to the payload RAM in the IPRM of the receive pipeline (ST 304). Thus, the header is split from the payload and the payload is written to local RAM while the header is sent on a specific multicast replication route implemented in the HCA. When the payload is written, the payload reference counter in the IPRM is incremented. The multicast packet header details may also be written to a data structure in the IPRM.

In one or more embodiments of the invention, the payload for unicast and other packet types is also written to the payload RAM in the IPRM. However, the headers for unicast and other packet types are then sent through the receive pipeline within the responder processing logic, and thus, follow a different general path within the responder processing logic than multicast headers. Accordingly, headers for all packet types are inspected as they leave the IPRM, and headers belonging to multicast packet types are pulled out of the normal packet processing stream for unique processing and inspection. The multicast header information necessary for determining the multicast packet destinations are stored in a data structure (254 in FIG. 2) between the receive pipeline and the EPS.

Such multicast header information may include MC LIDs and MC GIDs. The MC LID is used by the virtualized system described in FIG. 1 to replicate a copy of the multicast packet to all eligible virtual HCAs. In the next level of granularity for determining the eventual multicast group destinations, each eligible virtual HCA uses the MC GID to determine the QPs which belong to the multicast group and corresponding to each vHCA.

Subsequently, the MC LID and MC GID information from the multicast header is inspected to determine destination virtual functions and corresponding QPs which are part of the multicast group to which the multicast packet header is directed (ST 306). In one or more embodiments of the invention, the inspection and determination of destinations for the multicast packet header may be done in the EPS (firmware) or software. Alternatively, the inspection and destination determination may be performed directly in hardware within the HCA. Upon determining the destination functions and QPs, this information is written to a replication request data structure, along with other information that needs to be replicated for each copy of the multicast packet (ST 308). For example, the replication request data structure may store details about the packet header itself and some control information needed by the responder processing logic to process each multicast packet in the receive pipeline. Such information may include a pointer to the payload RAM where the payload for the multicast packet is stored, the size of the payload stored, one or more validation keys from the Infiniband® header which may be used to validate the request to transmit the multicast packet, a packet opcode, and other Infiniband® header information used to identify the sender of the packet and to write a completion to the completion queue once the packet is successfully transmitted/received.

In ST 310, a copy of the multicast packet descriptor is injected into the packet receive pipeline for each destination that is determined for the multicast packet. In one or more embodiments of the invention, for each copy that is injected, the payload reference counter is incremented by one (ST 312). Accordingly, the payload reference counter tracks the number of copies of the payload that need to be written to all the destination QPs. In one or more embodiments of the invention, the PRC acts as a placeholder to ensure that the payload for the multicast packet remains in the payload RAM until the reference count is zero (0) so as to not prematurely flush the payload from the payload RAM. This is because while a descriptor for each packet is copied and processed through the responder processing logic and receive pipeline of the HCA, only a single payload exists for the multicast packet (stored in the payload RAM) in one or more embodiments of the invention. This single copy of the payload is copied to the host memory at the final stage of multicast packet replication. Thus, the PRC ensures that the payload of the multicast packet remains in the payload RAM at least until the last descriptor copy is written to the host memory.

In ST 314, a determination is made as to whether all copies of the multicast packet header for each destination has been injected into the pipeline for normal packet processing. If further copies remain to be injected, the process returns to ST 310. When each multicast packet descriptor is processed, the payload RAM directly provides (writes) a copy of the payload to each destination QP (ST 316). When all copies have been injected, a final 'dummy' copy is injected into the packet processing pipeline but is not written to memory (ST 318). In one or more embodiments of the invention, this 'dummy' copy does not increment the payload reference counter, but causes a decrement to the payload reference counter when the 'dummy' copy is processed through the packet pipeline. This counteracts the initial increment of the payload reference counter when the payload is stored in the payload RAM. Thus, the payload reference counter ensures that the packet payload is held in the payload RAM until the final 'dummy' copy of the packet descriptor is processed.

In one or more embodiments of the invention, as an alternative to ST 318, a last copy of the packet may be marked as a "last packet" when the descriptor is injected into the receive pipeline. In such a scenario, the reference count increment for the marked last copy is skipped. Accordingly, no 'dummy packet' is necessary to offset the initial count of '1' when the payload is stored in the payload RAM. Instead, the last copy of the packet descriptor serves as the final decrement of the PRC. Therefore, in one or more embodiments of the invention, the initial PRC count of 1 holds the packet in the payload RAM while copies are being made. Each copy of the packet descriptor that is injected into the pipeline, before the last copy, results in a PRC increment, so it is not possible for the reference count to hit 0 prematurely (due to data being sent for one of the copies prior to all copies being injected). The final injected packet descriptor copy is marked as the final copy so that the header FIFO may be popped, and the reference count is not incremented when that copy is injected.

While the process of FIG. 3 described above referred to a replication mechanism for a single multicast packet as received by the HCA, the process of FIG. 3 may be repeated for each multicast packet that is received by the responder processing logic of the HCA. More specifically, for each multicast packet that is received, data is populated in the respective multicast data structures shown in FIG. 2, destination functions and QPs are determined, and copies of the multicast descriptors are injected into the receive pipeline for processing. In one or more embodiments of the invention, a single PRC is incremented and decremented as described above for each packet received. That is, multicast packets may be processed serially. Alternatively, there may be multiple PRCs stored in the IPRM for each multicast packet is that received. In this case, several multicast packets may be processed in parallel. The payload RAM stores the payload for each multicast packet until the PRC decrements to zero.

Figure 4:
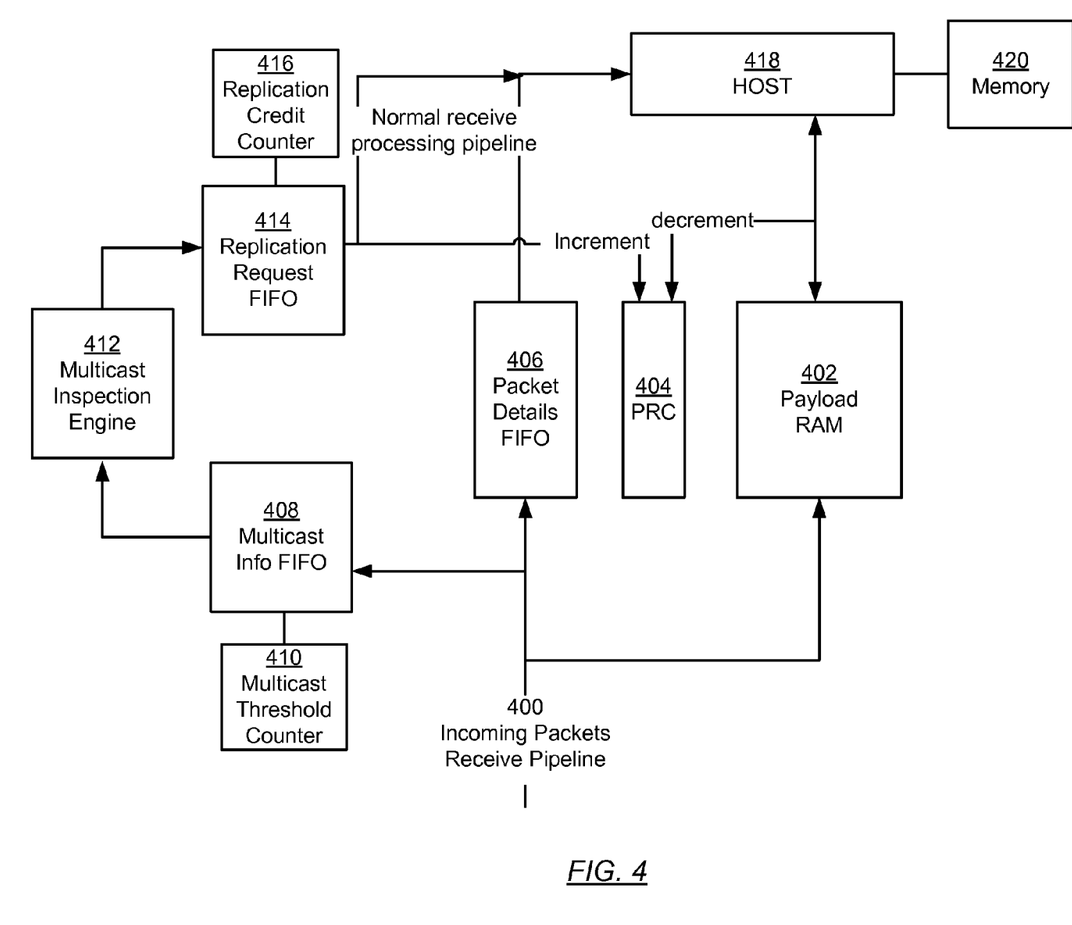
FIG. 4 shows an example of hardware multicast replication in one or more embodiments of the invention.

FIG. 4 shows a flow diagram for flow control for the multicast packet replication mechanism described by embodiments of the present invention. Specifically, FIG. 4 is an example of how multicast packet replication is implemented in the Infiniband® HCA, and is not meant to limit embodiments of the invention.

Initially, a multicast packet is received, among other unicast packets, from the Infiniband® network and Infiniband® port(s), to the receive pipeline of the Infiniband® host channel adapter (HCA) (400). All payloads are stored in the payload RAM (402). Assuming the payload reference count is zero, when a multicast payload is stored in the payload RAM, the PRC (404) is incremented to one (1). At this stage of the packet flow, multicast packet headers are split from other packet headers. While packet headers for unicast and other packet types are sent via the packet details FIFO (406) to the normal packet processing pipeline (422), the packet headers for multicast packets are sent to the multicast information FIFO (408). The multicast information FIFO stores the MC LID and MC GID information from the multicast header and then control is handed over to multicast inspection engine (412) in the EPS. In one or more embodiments of the invention, the IPRM may increment the multicast threshold counter (410) for each MC LID/MC GID pair that is stored in the multicast information FIFO (408). The IPRM may also periodically perform a check by comparing the multicast threshold counter (410) to a predetermined threshold to ensure that multicast processing is not bottlenecking processing of other packet types.

While the various data structures for storing multicast packet information are shown as FIFOs (406, 408, 414), any suitable data structure type may be implemented in embodiments of the invention.

Continuing with FIG. 4, the multicast inspection engine (412) pops off the multicast information FIFO and finds all of the destinations (underlying functions and corresponding QP destinations) for the packet. For each copy needed, the multicast inspection engine (412) writes a command to the Replication Request FIFO (414) including the destination vHCA number(s) and the destination QP number(s) in that vHCA. For purposes of this example, assume that the multicast packet being processed has four destination QPs to which the multicast packet is to be written to memory. As described above, the Replication Request FIFO (414) may also store other information from the IB or multicast headers that needs to be replicated for each of the four copies of the packet sent through the pipeline. Finally, the replication requirement FIFO (414) injects a copy of the multicast packet descriptor into the normal packet processing pipeline (422) and increments the PRC (404) for each copy injected. Accordingly, the PRC (404) count when the fourth copy of the multicast packet descriptor is injected is five (5).

Alternatively, in one or more embodiments of the invention, the replication request FIFO (414) may return control to the IPRM, in which case the IPRM may send a copy of the packet up the pipeline and increment the reference count for that packet's payload. In one or more embodiments of the invention, the IPRM may increment the replication credit counter (416) for every packet descriptor injected into the pipeline by the replication request FIFO. The replication credit counter (416) ensures that the replication request FIFO (414) does not overrun.

At this stage, the separate multicast processing for the multicast packet header ends, and the packet is processed normally through the packet processing pipeline (422) after the replication request FIFO (414) completes its function(s). The payload RAM (402) always decrements the payload reference count (404) when the payload for each multicast packet copy is read out. Accordingly, when each of the multicast packet descriptors find each of the four QPs of the multicast group, a copy of the payload is read out from the payload RAM (402) and written to each QP in main memory (420) of the virtualized host (418), and the PRC (404) is decremented. For each of the four copies of the multicast packet written to destination QPs, the PRC (404) is decremented, which results in the PRC (404) being decremented to one (1).

When the last (fourth) copy of a particular packet is sent, an encoded command is sent from the IPRM to the replication request FIFO (414) indicating 'last packet sent'. At this point, the IPRM removes the packet header contents from the Packet Details FIFO (406). Simultaneously, a 'dummy' copy of the packet is sent up the pipeline and to the host (418), but this copy is not written to memory (420). Alternatively, a last copy of the packet descriptor is marked as a 'last copy', resulting in the PRC increment to be skipped. The purpose of the 'dummy' copy or the last marked copy is to provide the final reference count (404) decrement (to offset the initial value of 1 when the packet first arrived and the payload was written to the payload RAM (402)) and ensures that the PRC (404) does not hit ref_count=0 prematurely. Accordingly, the PRC (404) is only decremented to zero after either the 'dummy' copy or the last marked copy of the packet descriptor is sent up the pipeline. The payload RAM (402) frees the space occupied by the multicast payload when the payload reference count (404) reaches 0.

As shown by way of the flow diagram of FIG. 4, embodiments of the invention provide a mechanism for hardware multicast replication in a host channel adapter associated with the Infiniband® network. Hardware provides state for tracking copies of the packet and mechanisms for limiting the number of multicast packets stored at any time via the various counters associated with multicast packet processing. The firmware provides the additional functionality for multicast destination determination and storing of information that must be replicated for each destination. This may allow for improved multicast performance and allows multicast group QPs to be treated the same as unicast QPs, resulting in general performance improvements in the entire design of the HCA to be more easily realized.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for multicast replication by a host channel adapter (HCA), comprising:
receiving, by the HCA, a multicast packet, wherein the HCA comprises responder processing logic for processing packets through a receive pipeline in the HCA;
storing, in a payload random access memory (RAM) within the HCA, a multicast packet payload corresponding to a data portion of the multicast packet;
identifying, from a multicast header of the multicast packet, a plurality of destination underlying functions and a plurality of corresponding destination QPs within a multicast group to which the multicast packet is directed, wherein each destination underlying function of the plurality of destination underlying functions corresponds to a virtual machine located on a host operatively connected to the HCA;
identifying, from the multicast header, information to be replicated for each multicast packet destination;
injecting, by the HCA, a number of multicast packet descriptors corresponding to a number of the corresponding destination QPs into the receive pipeline of the HCA, wherein each multicast packet descriptor comprises the information to be replicated, wherein the multicast packet descriptors are processed in the receive pipeline of the HCA; and
copying, from the payload RAM, the multicast packet payload to each of the corresponding destination QPs in host memory.

2. The method of claim 1, wherein identifying the plurality of destination underlying functions and the plurality of corresponding destination QPs further comprises:
extracting, from the multicast header, a multicast local destination identifier and a multicast global destination identifier; and
storing the multicast local destination identifier and the multicast global destination identifier in a multicast information data structure.

3. The method of claim 1, further comprising:
incrementing a payload reference counter when the multicast payload is stored in the payload RAM;
incrementing the payload reference counter for each copy of the multicast packet descriptor injected into the receive pipeline; and decrementing the payload reference counter each time the multicast packet header is processed through the receive pipeline and when a dummy copy is processed through the receive pipeline, wherein the payload of the multicast packet is flushed from the payload RAM when the payload reference counter is decremented to zero.

4. The method of claim 1, further comprising:
incrementing a multicast threshold counter for each MC LID/MC GID pair that is stored;
periodically comparing the multicast threshold counter value to a predetermined threshold; and
preventing new incoming multicast processing in the HCA when the multicast threshold counter value is greater than the predetermined threshold.

5. The method of claim 1, further comprising:
storing multicast packet header details in a data structure in the receive pipeline,
wherein the multicast packet header details are flushed when a command is transmitted indicating that a last copy of the multicast packet header has been injected into the receive pipeline.

6. The method of claim 5, further comprising:
storing, in a replication request data structure operatively connected to the receive pipeline, the information to be replicated for each multicast packet destination.

7. The method of claim 6, further comprising:
tracking a number of entries in the replication request data structure using a replication credit counter; and
decrementing the replication credit counter when the command is transmitted to the replication request data structure.

8. The method of claim 1, wherein the multicast packet is received via the Infiniband® network, and wherein the HCA is an Infiniband® HCA.

9. The method of claim 1, wherein each underlying function exposes a virtualized HCA associated with a corresponding virtual machine executing on the host, to the HCA.

10. The method of claim 1, further comprising:
injecting, by the HCA, a dummy copy of the multicast packet descriptor into the receive pipeline of the HCA, wherein when the dummy copy of the multicast packet descriptor completes processing in the receive pipeline, this indicates that all copies of the multicast packet have been replicated.

11. A host channel adapter (HCA) comprising:
a plurality of underlying functions, wherein each of the plurality of underlying functions corresponds to a virtual machine in a host operatively connected to the HCA;
a receive packet processing pipeline, the receive packet processing pipeline being configured to:
  receive a multicast packet comprising a multicast header and a payload corresponding to a data portion of the multicast packet;
  store, in a payload random access memory (RAM) within the HCA, the multicast packet payload;
a multicast inspection engine configured to:
  identify, from the multicast header of the multicast packet, a subset of the plurality of destination underlying functions and a plurality of corresponding destination QPs within a multicast group to which the multicast packet is directed; and
  identify, from the multicast header, information to be replicated for each multicast packet destination,
wherein the receive packet processing pipeline is further configured to:
  inject a number of multicast packet descriptors corresponding to a number of the plurality of corresponding destination QPs identified by the multicast inspection engine into the receive packet processing pipeline, wherein each multicast packet descriptor comprises the information to be replicated; and
  copy, from the payload RAM, the multicast packet payload to each of the corresponding destination QPs in host memory.

12. The HCA of claim 11, further comprising:
a multicast information data structure configured to store a multicast local destination identifier (MC LID) and a multicast global destination identifier (MC GID) from the multicast packet header; and
a replication request data structure configured to store information to be replicated for each multicast packet destination, wherein the information to be replicated is used in each multicast packet descriptor injected into the receive pipeline,
wherein the multicast information data structure and the replication request data structure are communication points between the receive packet processing pipeline and the multicast inspection engine.

13. The HCA of claim 12, further comprising:
a replication credit counter for tracking a number of entries in the replication request data structure,
wherein the replication credit counter is decremented when the command is transmitted to the replication request data structure.

14. The HCA of claim 12, wherein a multicast threshold counter is incremented each time the multicast information data structure stores a MC LID/MC GID pair.

15. The HCA of claim 14, wherein the multicast threshold counter is compared to a predetermined threshold and when the multicast threshold counter is greater than a predetermined threshold, new incoming multicast packets are not processed.

16. The HCA of claim 11, wherein the multicast packet is received via the Infiniband® network, and wherein the HCA is an Infiniband® HCA.

17. The HCA of claim 11, wherein each underlying function exposes a virtualized HCA associated with a corresponding virtual machine executing on the host, to the HCA.

18. The HCA of claim 11, further comprising:
a payload reference counter,
wherein:
  the payload reference counter is incremented when the multicast payload is stored in the payload RAM,
  the payload reference counter is incremented for each copy of the multicast packet descriptor injected into the receive pipeline,
  the payload reference counter is decremented each time the multicast packet header is processed through the receive pipeline and when a dummy copy is processed through the receive pipeline, and
  the payload of the multicast packet is flushed from the payload RAM when the payload reference counter is decremented to zero.

19. A system comprising:
a host comprising:
  a first virtual machine comprising a first destination queue pair (QP); and
  a second virtual machine comprising a second destination QP; and a host channel adapter (HCA) operatively connected to the host and comprising:
  a first underlying function corresponding to the first virtual machine;
  a second underlying function corresponding to the second virtual machine;
  a receive packet processing pipeline, the receive packet processing pipeline configured to:
    receive a multicast packet comprising a multicast header and a payload corresponding to a data portion of the multicast packet;
    store, in a payload random access memory (RAM) within the HCA, the multicast packet payload;
  a multicast inspection engine configured to:
    identify, from the multicast header of the multicast packet, the first and second underlying functions and corresponding first and second destination QPs within a multicast group to which the multicast packet is directed; and
    identify, from the multicast header, information to be replicated for each multicast packet destination;
  wherein the receive packet processing pipeline is further configured to:
    inject a multicast packet descriptor for each of the corresponding first and second destination QPs identified by the multicast inspection engine into the receive packet processing pipeline, wherein each multicast packet descriptor comprises the information to be replicated; and
    copy, from the payload RAM, the multicast packet payload to each of the first and second corresponding destination QPs in host memory.

20. The system of claim 19, wherein each of the first and second underlying functions exposes a virtualized HCA associated with the corresponding first and second virtual machines executing on the host, respectively, to the HCA.

* * * * *

UNITED STATES PATENT AND TRADEMARK OFFICE
CERTIFICATE OF CORRECTION

| | | |
|---|---|---|
| PATENT NO. | : 8,937,949 B2 | Page 1 of 1 |
| APPLICATION NO. | : 13/721704 | |
| DATED | : January 20, 2015 | |
| INVENTOR(S) | : Manula et al. | |

It is certified that error appears in the above-identified patent and that said Letters Patent is hereby corrected as shown below:

On the Title Page, column 2, item (57), under Abstract, line 9, delete "function of" and insert -- function --, therefor.

In the Specification,

In column 4, line 57, delete "machine" and insert -- machine. --, therefor.

In column 6, line 57, delete "machine" and insert -- machine. --, therefor.

In column 6, line 60, delete "machine" and insert -- machine. --, therefor.

Signed and Sealed this
First Day of September, 2015

Michelle K. Lee
*Director of the United States Patent and Trademark Office*